United States Patent [19]
Andrews

[11] 3,900,130
[45] Aug. 19, 1975

[54] INSERT FOR SECURING IN A HOLE

[75] Inventor: Sydney Alan Andrews, Stapleford, England

[73] Assignee: TRW Inc., Cleveland, Ohio

[22] Filed: Jan. 22, 1973

[21] Appl. No.: 325,781

[30] Foreign Application Priority Data
Jan. 26, 1972 United Kingdom............ 3743/72

[52] U.S. Cl. ............... 220/378; 220/242; 220/378; 403/252
[51] Int. Cl. ...................... B65d 41/10; B65d 39/04
[58] Field of Search ...... 220/24 A, 24.5, 24.2, 24.3, 220/213, 242, 378

[56] References Cited
UNITED STATES PATENTS

| | | |
|---|---|---|
| 1,189,294 | 7/1916 | Ruggles............................ 220/24 A |
| 1,491,325 | 4/1924 | Thomas, Jr. .................. 220/24 A X |
| 1,792,897 | 2/1931 | De Lacy ........................... 220/24 A |
| 2,024,495 | 12/1935 | Wolfe......................... 220/24.5 UX |
| 2,671,574 | 3/1954 | Wolfe ................................ 220/24.5 |
| 3,015,682 | 1/1962 | Cheske....................... 220/24 A UX |
| 3,131,825 | 5/1964 | Sarafinas............................ 220/24.5 |
| 3,244,308 | 4/1966 | Esposito, Jr. .................. 220/24.5 X |
| 3,662,914 | 5/1972 | Slade ................................ 220/24 A |

*Primary Examiner*—John Petrakes
*Attorney, Agent, or Firm*—James R. O'Connor

[57] ABSTRACT

An insert for closing a hole in a panel comprises a tubular member having at one end thereof an integral radial flange carrying a resilient sealing material, and at the other end thereof an integral closed re-entrant part. The tubular member and the re-entrant part thereof are generally convergent in the direction of the flange at substantially different angles, and the re-entrant part has a free end lying adjacent to but below the flange.

The insert is secured after placing in a hole in a panel by delivering a sharp blow to the free end of the re-entrant part whereby to increase the convergence of the tubular member and thereby cause it to grip the panel.

3 Claims, 4 Drawing Figures

INSERT FOR SECURING IN A HOLE

This invention relates to inserts for securing in holes formed in thin plates or sheets of metal or other rigid or firm material.

Such an insert may be used to permanently close a hole which has served its intended purpose and is no longer required, or to perform some other useful function such as to reduce the effective diameter of a hole to a desired new size, or provide a suitable mounting for a component.

In the prior art, a proposal has been made (see U.S. Pat. No. 1,792,897 — DE LACY) to close such a hole by inserting into the hole from an accessible side thereof (hereafter called 'the front side') a flanged tubular insert having a closed transverse leading end part, so that the flange abuts the plate surrounding the hole on the front side thereof, and then, from the front side of the plate, to operate on the part of the insert lying on the opposite side of the plate (hereafter called 'the rear side') so as to deform that part in a radially outward direction whereby to form a radially-enlarged leading end on the insert which acts to engage the insert securely on the plate.

In this proposal the closed transverse leading end part of the insert remains in the same axial position relative to the flange (see FIG. 2) during the radial expansion of the adjoining annular re-entrant part which joins the said end part to the tubular shank of the insert, the radial deformation of the insert being such as to solely re-direct the said annular re-entrant part from an axial to a radial disposition. It appears that a successful securing of the insert cannot be obtained by applying an axial thrust to the closed transverse end part of the insert from the front side of the plate, and there is no teaching directed to the use of such an axial thrust to secure the insert.

With such an insert the method of securing it is generally inconvenient and time-consuming, since the apparently preferred way (and probably the only practical way) of radially deforming the annular re-entrant part is by way of a spinning operation. In many instances spinning is not a convenient operation for securing an insert in a hole.

In a second prior art proposal (See U.S. Pat. No. 3,072,287 — SAMPSON) an insert has a cup-shaped part supported on an axially-deformable, radially re-entrant flange, the flange having tangs at its free perimeter which are bent into an axial direction around the cup-shaped part for insertion into a hole in a plate. The tangs are provided with hemispherical inward projections adjacent the base of the cup-shaped part, which act as tang-driving cams when after placing the tangs into the hole to be closed the radial flange is axially deformed by an axially-applied pressure, the tangs being thereby bent outwardly to secure the insert in the hole.

In this second proposal the insert relies on the axial deformation of the hollow flange to drive the inner cup-shaped part through the hole and so cam the tangs outwardly.

Furthermore, the insert grips the hole edge only at intermittent spaced positions, and the insert is a relatively complicated article to make. Moreover, the axial pressure is applied to the "top of the hollow collapsible head" and there is no teaching to do otherwise in securing the insert.

Whereas DE LACY instructs the reader to provide extra metal in a cup-shaped insert end and to apply radial pressure to deform that extra metal in an insert securing manner, SAMPSON instructs the reader to provide a cup-shaped part which by axial movement, on collapsing the hollow flange, is used to outwardly deflect a series of spaced tangs and so secure the insert in the hole.

According to the present invention an insert for securing in a hole in a thin plate of firm material comprises a tubular member of a firm but deformable material having formed integrally therewith at one end (referred to hereafter as the 'first end') an outwardly extending flange part, and at the other end (hereafter referred to as the 'second end') a re-entrant tubular part, the tubular member and the said re-entrant part each being generally convergent in the direction of the said first end at substantially different angles, and the transition from the tubular member to the said re-entrant tubular part being smooth whereby after insertion of the tubular member through a hole as aforesaid from a front side of the plate a thrust applied axially of the tubular member to the free end of the re-entrant tubular part is effective to move that free end axially and thereby increase the convergence of the said re-entrant tubular part and the tubular member, thus expanding the tubular member radially into contact with parts of the plate defining the hole and so securing the insert in the plate.

The re-entrant tubular part may include at its free end an axially-aligned cylindrical part thereof; and preferably the re-entrant part includes at its free end a transverse end part formed integrally therewith.

Likewise, the re-entrant part preferably terminates at its free end adjacent to but not projecting beyond the said first end of the tubular member.

The flange part may have a peripheral rim upstanding in the direction of the said second end of the tubular member, and carrying an adherent layer of resilient sealing material on the side thereof facing the said second end of the tubular member whereby to provide a water-tight seal with the front side of a plate in which the insert is to be secured.

The insert may comprise a pressing formed from a thin sheet of firm but deformable material, which may be a metal or a plastics material. Alternatively, the insert may be moulded from a plastics material.

The transverse end part may have an aperture therein, for example receiving an article to be secured in the insert.

According to another aspect of the present invention, a method of at least partly closing a hole in a thin plate of a firm material comprises the steps of a. inserting in the said hole the tubular member of an insert as specified above so that the flange part lies adjacent the front side of the plate, b. holding the insert in this position, and c. applying an axial thrust to the free end of the re-entrant tubular part whereby to move the free end of the re-entrant tubular part axially and thereby to radially expand the tubular member into contact with parts of the plate defining the hole.

According to yet another aspect of the present invention, there is provided a plate having a hole therein closed, or at least partly closed, by an insert secured in the hole by the aforesaid method.

Inserts having the features referred to above are particularly suited to the closing or part closing of holes of circular shape.

One hole closing insert and a method of closing a hole using such insert according to the present invention will now be described by way of example with reference to the accompanying drawing in which.

Figure 1:
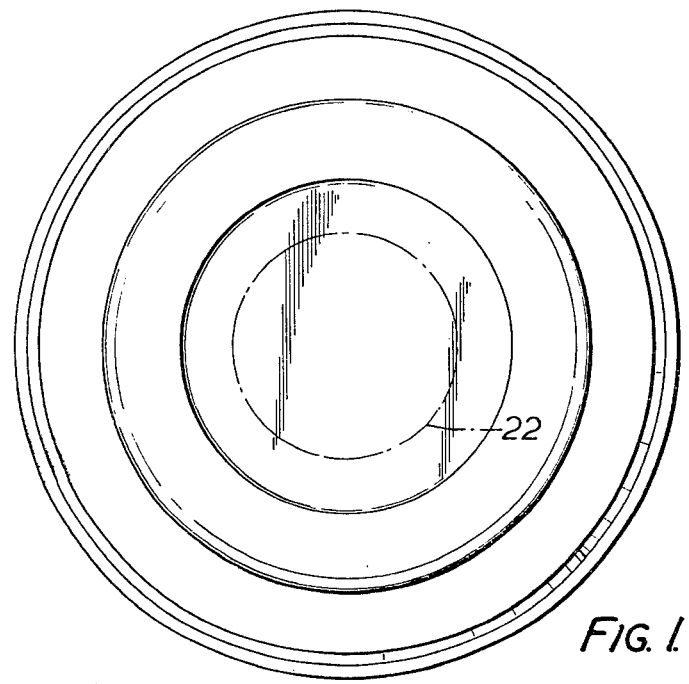
FIG. 1 shows an underside view of the insert.
Figure 2:
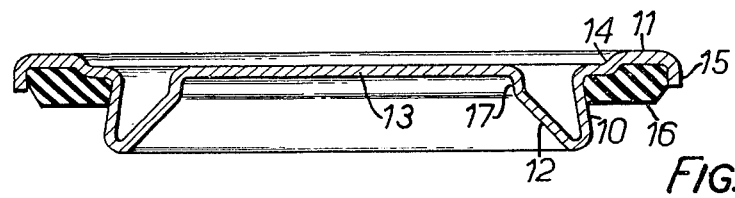
FIG. 2 shows a diametral cross section of the insert taken on the horizontal diameter of FIG. 1.

Referring now to the FIGS. 1 and 2, the insert there shown is generally circular in form, and comprises a tubular portion 10 having formed at one end thereof a flange 11, and at the other end a re-entrant tubular part 12 whose free end is closed by a transverse part 13.

The flange is stepped at 14, has an upturned edge or rim 15, and has adherent thereto a rubber sealing ring 16.

The tubular portion 10 is flared outwardly from its junction with the flange 11 at a small cone angle, whilst the re-entrant tubular part is convergent at a substantially greater cone angle from its junction with the tubular portion 10, and joins the transverse part 13 through a short cylindrical part 17.

The insert is made in a single piece as by pressing from a metal sheet, and the sealing ring 16 is formed by depositing a suitable rubber composition in liquid form around the flange and subsequently curing by heating.

The insert is conveniently manufactured by pressing from a flat blank or sheet of metal, either in a single operation, or in two successive operations the first of which establishes the tubular member relative to the flange part, and the second of which establishes the re-entrant tubular part relative to the tubular member.

To fix the insert in a hole 18 in a metal sheet 19, the tubular portion 10 is first inserted into the hole and held in position with the sealing ring pressing firmly against the plate surface which surrounds the hole. The free end of the re-entrant tubular part is then subjected to an axial thrust which may be applied gradually by a suitable device, or suddenly as by a hammer blow. The thrust may be applied directly, or through a suitable punch as illustrated at 20 in FIG. 3.

Figure 3:
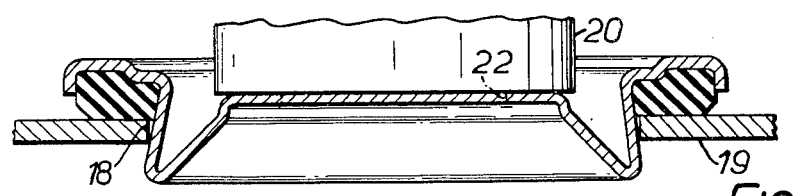
FIG. 3 shows a diametral cross section of the insert in position in a hole in a metal plate, at an intermediate stage in the process of fixing the insert.

In FIG. 3 the punch is shown applying an axial thrust to the transverse wall 13, and the punch has already moved this transverse wall to an intermediate position. In this position the re-entrant tubular part has been moved axially from its original position to a new position in which it has expanded the tubular portion 10 to a diameter at its end remote from the flange 14 which is greater than the diameter of the hole in the plate. Thus the insert is seen gripping the edge of the hole.

Figure 4:
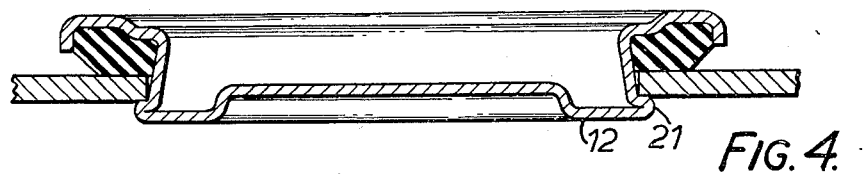
FIG. 4 shows a diametral cross section similar to that of FIG. 3, but with the fixing of the insert completed.

Further downward movement of the punch causes the metal of the tubular portion 10 adjacent the re-entrant tubular part to heel over outwardly on the underside of the metal plate 19 and so compress it against the sealing ring 16. The axial thrust is applied until with further downward movement of the punch the wall of the previously re-entrant tubular part 12 is deformed so that it extends parallel with the metal plate 19, as seen in FIG. 4. In this state the adjacent parts 21 of the tubular portion 10 and re-entrant tubular part 12 lie closely adjacent the metal plate and so clamp it firmly and permanently against the sealing ring.

It will be appreciated that axial movement of the free end of the re-entrant tubular part results in the expansion of the tubular member, so as (a) to grip the wall bordering the hole, and (b) to deform the end of the tubular member remote from the flange over the parts of the plate which bound the hole.

Due to the presence and substantial depth of the sealing ring, the insert can satisfactorily seal holes in plates, sheets or panels which have become distorted from their initial or desired plane condition.

Furthermore, the thickness of the metal from which the insert is made is small enough to allow the insert to conform to distortions of the metal surrounding the hole to be filled. In the example shown the insert is made from a sheet of thickness of the order of 0.01 inches.

The closed end wall 13 may in an alternative embodiment have a central hole (indicated in chain-dotted form in FIG. 1 at 22) for receiving some device to be fixed thereto and hence to the metal plate 19, or for reducing the size of the aperture to be left in the plate 19.

Such inserts as described above may be used for closing holes in bodywork panels of motor vehicles. Such holes are formed, for example, in the underside parts for allowing paint or sealing compounds to drain away from the bodywork after it has been dipped into a vat of such a liquid. Other holes to be closed by such inserts are those formed in the bodywork so as to receive devices which are optionally fitted on one side or the other of the vehicle according to whether right-hand or left-hand drive is required. Such bodywork holes are required to be plugged in a watertight manner so as to prevent the ingress of rain water.

The insert described above is particularly well suited to this purpose of plugging unwanted holes in motor vehicle bodywork, since a skilled operator may with but a single stroke of a hammer permanently fix an insert in position in a superfluous hole.

Though the insert described above is made by pressing a metal, such as steel, which is capable of being permanently deformed by pressing or drawing, such an insert may also be formed by moulding from a suitable, resilient though firm, plastics material, in which case the insert when in the fixed position will have the so-called re-entrant tubular part 12 not parallel with the plate as shown in FIG. 4, but slightly conical in the opposite from original sense, being held in this position by an over-centre or toggle action of that part of the insert.

I claim:

1. An insert for assembly in a through opening in a thin plate of firm material, said insert including a tubular member which will extend through said plate opening, an outwardly extending flange part integral with one end of said tubular member, said flange part carrying an adherent layer of resilient sealing material which will overlie one side of said plate at the edge of the opening therein, and a re-entrant tubular part having an integral, terminal, transverse free end part, said re-entrant, tubular part being integrally joined to the end of said tubular member remote from said flange part in a single, smooth, reverse bend which will lie beyond, but relatively closely proximate, the edge of said plate opening at the other side of said plate so that said re-entrant tubular part will extend from said bend back through the opening in said plate and its transverse free end part will lie beyond said one side of said plate, said tubular member and said re-entrant tubular part each being formed from a firm but deformable material and each of said member and said part being generally convergent from said reverse bend toward their ends remote from said bend, the end of said tubular member remote from said flange part being radially expansible and axially collapsible to provide a bead of twice the thickness of the material forming said tubular member overlying said other side of said plate adjacent the edge of said plate opening to lock said insert in said opening and draw said sealing material tightly against said one side of said plate responsive to the application of an axial force to the free end part of said re-entrant tubular part which is effective to move said free end part to a position wherein it lies generally coplanar with said plate.

2. An insert according to claim 1 wherein said reentrant tubular part has an axially aligned cylindrical part adjacent its free end part.

3. An insert according to claim 1 wherein said flange part has a peripheral rim extending therefrom in the direction of said tubular member remote from said flange part.

* * * * *